R. BENNETT.
SAW TOOL.
No. 11,661. Reissued Apr. 26, 1898.
Fig. 1,
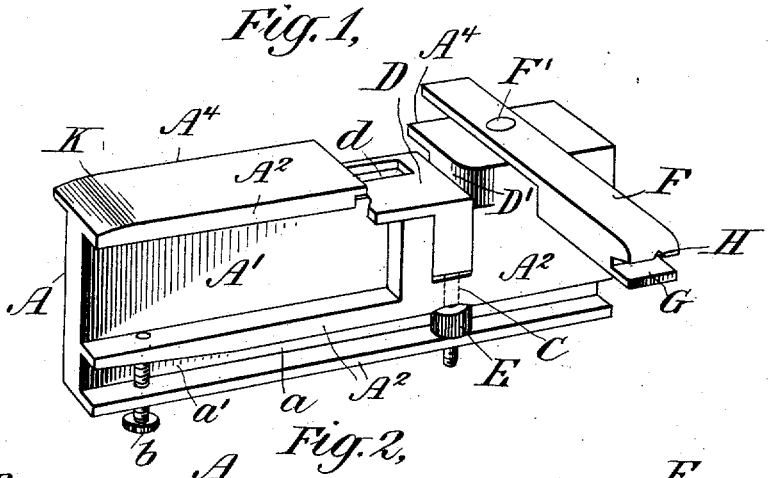
Fig. 2,
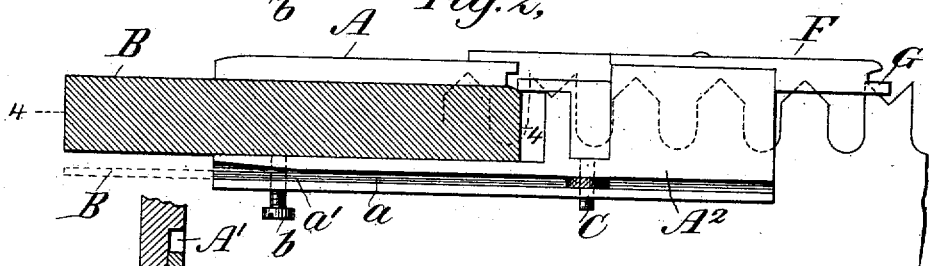
Fig. 4,
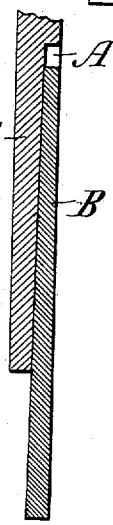
Fig. 3,
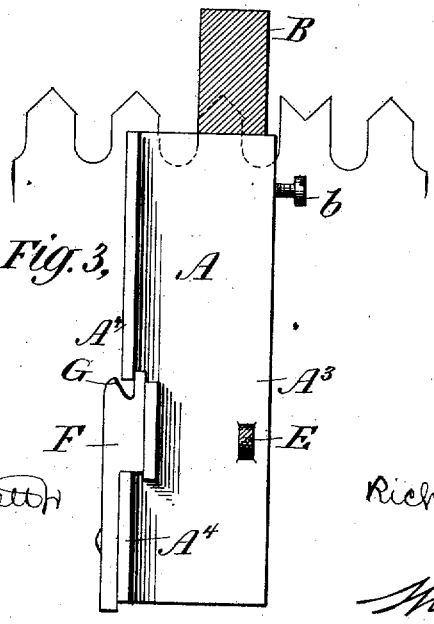
Fig. 5,
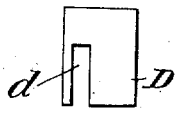
WITNESSES:
Nicholas M. Woodlett
INVENTOR
Richard Bennett
BY
Mitter & Kenyon
ATTORNEYS
THE NORRIS PETERS CO., PHOTO-LITHO., WASHINGTON, D. C.

UNITED STATES PATENT OFFICE.

RICHARD BENNETT, OF NEWARK, NEW JERSEY, ASSIGNOR TO THE BENNETT COMBINATION SAW-TOOL COMPANY, OF NEW YORK.

SAW-TOOL.

SPECIFICATION forming part of Reissued Letters Patent No. 11,661, dated April 26, 1898.

Original No. 569,993, dated October 27, 1896. Application for reissue filed February 25, 1898. Serial No. 671,718.

*To all whom it may concern:*

Be it known that I, RICHARD BENNETT, a citizen of the United States, residing at Newark, in the county of Essex, State of New Jersey, formerly residing at Raquette Lake, in the county of Hamilton, State of New York, have invented certain new and useful Improvements in Saw-Tools; and I do declare the following to be a clear and exact description of the invention, such as will enable others skilled in the art to which it pertains to make and use the same, reference being had to the accompanying drawings, and the letters of reference marked thereon, which form a part hereof.

This invention relates to saw-tools; and it has for its object the provision of an improved side-dresser, whereby the teeth of a saw may be quickly and accurately dressed, so as to have a uniform "set;" to provide an improved gage for cutting down the raker or cleaner teeth, whereby such teeth, of whatever size or interval apart, may be easily, accurately, and uniformly cut down to the degree required, and to provide a single element or tool in which these devices and a setting device and a jointer for the teeth or a plurality of some of said devices are united or combined in such a way as to produce a compact device whose features assist each other in the production of the results sought and which tool can be carried by a woodman in his pocket and used by him without the necessary use of a special shop equipment.

The invention consists of the side-dresser and the raker-tooth gage, constructed as hereinafter set forth, and also in the peculiar construction of the combination-tool whereby some or all of its various features are united in one compact, convenient, and efficient tool.

The invention is clearly illustrated in the accompanying drawings, which, with the letters of reference marked thereon, form part of this specification, and in which—

Figure 1 is a perspective view of my improved combination-tool in its best form with the setting member shown as swung to one side. Fig. 2 is a side elevation of the tool as applied to a saw in the position required in cutting down the raker-teeth, the saw being shown on the farther side of the tool. Fig. 3 is a side elevation of the tool as it appears while holding a file in position for dressing a saw-tooth. Fig. 4 is a longitudinal vertical section on the line 4 4 of Fig. 2 and showing the side-dresser, and Fig. 5 is a plan view of the raker-teeth gage detached.

Reference being now had to the details of the drawings by letter, A designates the stock or body portion of the tool, having the flat even faces $A^2$ and $A^3$, which provide bearing-surfaces for the side of the saw, for the purposes hereinafter mentioned. In the face $A^2$ is a recess $A'$, which extends longitudinally from one end of the stock to any convenient point therein, as to a point adjacent to the longitudinal center of the stock, where is located the raker-tooth gage, which will be hereinafter described. This recess might of course be shorter or longer and might also extend the entire length of the stock, if desired. It is longitudinally graduated or tapered in depth and is designed to receive and hold a flat file B, longitudinally graduated or tapered to correspond with the recess $A'$, so that its upper or working face will always be parallel to the bearing-face $A^2$. When the file is home in the recess, its upper or working face will be flush with the bearing-face $A^2$ of the stock. As the file is slowly moved from its home position its upper face will gradually sink below the level of the face $A^2$, but will always remain parallel therewith. Means, such as the set-screw *b*, is provided to secure the file firmly in the recess in the position desired.

The position in which the file is secured in the recess will depend upon the amount of set which the teeth are to have. In using the side-dresser the stock is held in the position shown in Fig. 3, with the even face $A^2$ held firmly against the side of the saw-body and then moved outward along the side of each tooth separately. Before beginning this operation, however, the file is first fixed in the recess $A'$ in the position required to take off from the teeth having too much set just the required amount, so that when the side-dressing is completed all the teeth will have the same amount of set. If a tooth has been so set as to require no side dressing, then the file will pass over it without touching it; but if a tooth has too much set the file will cut it down the required amount. In the face $A^2$ is also the narrow recess *a*, designed to receive the file B edgewise for the purpose of forming a device for jointing the saw-teeth. It is provided with suitable means, as the set-screw *b*, for holding the file in place. This recess *a* is slightly widened or tapered in width at one end at *a'*, opposite the set-screw *b*, in order that the file may be bent or sprung slightly when in the recess, and thus made to conform to such curvature of the points of the saw-teeth as they may have. In using the jointer the face $A^2$ is laid flat against the side of the saw-body, so as to act as a bearing-surface, with the face of the file projecting at right angles to the face $A^2$ and resting on the points of the teeth. Movement of the tool then causes the file to act on the points of the teeth to joint them.

$A^4$ is a flange projecting at right angles from the upper edge of the stock. In a recess D', cut in this flange and in the body of the stock, is the raker-teeth gage D, adjustable in the recess by suitable means, as by the screw *c*, fixed to the gage D, and the nut E. The recess D' may be dovetailed. The gage is flush on one side of the stock with the face $A^2$ and has a slot *d* cut from its free end on the other side of the stock. This slot therefore is open at one end, as shown more clearly in Fig. 5. In Figs. 1 and 2 the open end of the slot *d* is hidden. In using the gage the face $A^3$ is laid flat against the saw-body, as shown in Fig. 3, with the points of the teeth resting against the under side of the flange $A^4$ and a raker-tooth projecting slightly through the slot *d* of the gage, which has been previously adjusted. The flat face $A^3$ and the under side of the flange $A^4$ form, it will be seen, even bearing-surfaces for the saw, which enable the raker-teeth to be uniformly and accurately adjusted in the gage D. A file is passed over the projecting points of the raker-teeth, working over the top of the gage, which by embracing both sides of a raker-tooth insures its being cut down accurately at right angles to the side face of the saw.

Saws differ much in the width of their raker-teeth and in the intervals between such teeth, so that a gage with a closed slot, while capable of use on some saws, cannot be used on others. By having the slot *d* open at one end, as described, raker-teeth of any width and separated by any interval may be cut down, as required.

F is the setting member, provided at one end with a slot or notch G, set at an angle and movably secured to the flanged edge of the stock, as by the pivot-screw F'. The slotted or notched end of the member F is thickened, so as to fit into the recess D' above the gage D when the gage is adjusted low in the recess, as shown in Fig. 3. When the member F is in this position, its slot or notch G opens toward and slightly above the flanged edge of the stock. When the setting member is to be used, the slot or notch G is placed on the top of a tooth to be set and a blow upon the other end of the setting member then sets the tooth, the flanged edge of the stock being held firmly against the side of the saw-body and serving as an even bearing-surface for the side of the saw and enabling the member to be driven down exactly parallel with the side of the saw-body. In this way and by these means all the teeth may be set easily and uniformly and with substantial accuracy. The niche H, adjacent to the slot or notch G, is sometimes used when it is desired to set a tooth which has its bevels extending up to its point, the angle formed by the converging beveled edges being received in the notch H when the tooth is set, as above described, so as not to injure the tooth. When the gage D is to be used, the member F is removed from the slot D'.

When it is desired to use the tool as a common hammer set, one of the flat faces of the stock is beveled, so as to permit the saw-body to lie upon this flat face with its teeth projecting over the bevel. In Fig. 1 of the drawings, K designates this bevel.

What I claim as new, and desire to secure by Letters Patent, is—

1. As an article of manufacture, a saw-tool for side-dressing, comprising a suitable stock having one side or face thereof provided with an even bearing-surface, and with a recess in said face longitudinally graduated in depth, and a file adjustable in said recess and correspondingly tapered so as to have its outer face always parallel with the said bearing-surface of the stock, and means for holding the file in place, substantially as set forth.

2. As an article of manufacture, a saw-tool adapted for use in cutting down the raker-teeth of a saw, comprising a suitable stock, and an adjustable gage supported by the stock, and having a slot open at one end to receive a raker-tooth to be cut down, substantially as set forth.

3. As an article of manufacture, a saw-tool adapted for use in setting the cutting-teeth and cutting down the raker-teeth of a saw, comprising a suitable stock provided with a flange along one edge and having a recess therein, an adjustable raker-tooth gage working in said recess, a setting member movably secured to the flanged edge of the stock and having one of its ends provided with a setting-slot and normally resting in said recess above the said gage, the face of said flanged edge serving as an even bearing-surface for the side of the saw when the setting member is in use, and the lower side of said flange serving as an even bearing-surface for the points of the teeth when the gage is in use, substantially as set forth.

4. As an article of manufacture, a saw-tool comprising a stock or body portion having the even faces $A^2$, $A^3$, the face $A^2$ being provided with a recess or depression longitudinally graduated in depth, in which a tapering file may be adjustably seated for side-dressing saw-teeth and means for adjustably securing the file in said recess; said face having an independent and narrow recess *a*, within which the file may be held in position edgewise and sprung or bent for convenient use in jointing saw-teeth, a raker-tooth gage vertically adjustable in the recess D′ in the stock, the flange $A^3$, and the setting member F, combined and related, substantially as set forth.

5. As an article of manufacture, a saw-tool comprising a stock having the flat even sides $A^2$ and $A^3$, and flange $A^4$ extending from the flat even upper edge of the stock, the face $A^2$ having the recesses A′ and *a* constructed as described, the tapering file, the recess D′, gage D having the open slot *d*, and setting member F having slot G, substantially as set forth.

6. The herein-described combination-tool, the same comprising a stock or body portion having one of its faces provided with a tapering or graduated recess or depression A′ within which a file may be adjustably seated, a set-screw for adjusting and securing the file in said recess, an independent narrow and tapering recess *a* within which the file is adjusted and held in position for convenient use in jointing saw-teeth, a raker-tooth gage D vertically adjustable within a recess in the stock as described, means for vertically adjusting the gage-block, and the swinging setting member F, pivoted at a point adjacent to one of its ends to the stock, and having its opposite end notched as described, substantially as described and for the purpose specified.

In testimony whereof I have signed my name to this specification in the presence of two subscribing witnesses.

RICHARD BENNETT.

Witnesses:

EDWIN SEGER,

NICHOLAS M. GOODLETT, Jr.